United States Patent
Xiao

(10) Patent No.: US 10,533,833 B2
(45) Date of Patent: Jan. 14, 2020

(54) METHOD AND APPARATUS FOR CHARACTERISING INSTRUMENT ERROR

(71) Applicant: Taylor Hobson Limited, Leicester, Leicestershire (GB)

(72) Inventor: Shaojun Xiao, Leicester (GB)

(73) Assignee: TAYLOR HOBSON LIMITED, Leicestershire (GB)

( * ) Notice: Subject to any disclaimer, the term of this patent is extended or adjusted under 35 U.S.C. 154(b) by 0 days.

(21) Appl. No.: 15/309,012

(22) PCT Filed: Apr. 27, 2015

(86) PCT No.: PCT/GB2015/051223
§ 371 (c)(1),
(2) Date: Nov. 4, 2016

(87) PCT Pub. No.: WO2015/170076
PCT Pub. Date: Nov. 12, 2015

(65) Prior Publication Data
US 2017/0067729 A1    Mar. 9, 2017

(30) Foreign Application Priority Data

May 6, 2014 (GB) .................................. 1407984.2

(51) Int. Cl.
*G01B 5/012* (2006.01)
*G01B 5/28* (2006.01)
(52) U.S. Cl.
CPC .............. *G01B 5/012* (2013.01); *G01B 5/28* (2013.01)

(58) Field of Classification Search
None
See application file for complete search history.

(56) References Cited

U.S. PATENT DOCUMENTS

| | | | |
|---|---|---|---|
| 3,307,265 A * | 3/1967 | Jenks ....................... | G01B 3/12 33/772 |
| 4,770,536 A * | 9/1988 | Golberstein ......... | G01B 11/303 356/446 |
| 6,327,788 B1 | 12/2001 | Seddon et al. | |

(Continued)

FOREIGN PATENT DOCUMENTS

| CN | 1207807 A | 2/1999 |
|---|---|---|
| CN | 101432592 A | 5/2009 |

(Continued)

OTHER PUBLICATIONS

"Merit" from M-W, 1 page, printed Apr. 24, 2019.*
(Continued)

*Primary Examiner* — Tung S Lau
(74) *Attorney, Agent, or Firm* — RatnerPrestia

(57) ABSTRACT

A method for characterising instrument error in a surface measurement instrument, comprising obtaining first calibration measurement data representing a known surface form of a first reference object and obtaining second calibration measurement data representing a known surface form of a second reference object. At least a portion of the second calibration measurement data represents a measurement range that overlaps with at least a portion of a measurement range of the first calibration measurement data. A common error function is obtained that characterises the instrument error.

20 Claims, 5 Drawing Sheets

(56) References Cited

U.S. PATENT DOCUMENTS

| | | | |
|---|---|---|---|
| 6,594,532 B2* | 7/2003 | Mills | G01B 7/008 33/549 |
| 6,746,882 B1 | 6/2004 | Stirton et al. | |
| 7,466,429 B2* | 12/2008 | de Groot | G01B 11/0675 356/497 |
| 7,684,049 B2* | 3/2010 | De Groot | G01B 11/0675 356/497 |
| 7,900,367 B2 | 3/2011 | Sutherland | |
| 7,924,435 B2* | 4/2011 | Colonna De Lega | G01B 9/02057 356/511 |
| 8,072,611 B2* | 12/2011 | De Groot | G01B 9/0209 356/511 |
| 9,541,385 B2 | 1/2017 | Jonas et al. | |
| 2002/0059041 A1* | 5/2002 | Mills | G01B 7/008 702/127 |
| 2007/0139656 A1* | 6/2007 | Wan | G01B 11/0675 356/504 |
| 2009/0178472 A1 | 7/2009 | Banke, Jr. et al. | |
| 2009/0182528 A1* | 7/2009 | De Groot | G01B 11/06 702/167 |
| 2012/0150354 A1 | 6/2012 | Rogers et al. | |
| 2012/0234075 A1 | 9/2012 | Omori et al. | |

FOREIGN PATENT DOCUMENTS

| | | |
|---|---|---|
| CN | 102483621 A | 5/2012 |
| CN | 102792126 A | 11/2012 |
| EP | 2149775 A2 | 2/2010 |
| EP | 2840354 A1 | 2/2015 |
| GB | 2328025 A | 2/1999 |
| GB | 2422015 A | 7/2006 |
| GB | 2429291 A | 2/2007 |
| JP | H1183450 A | 3/1999 |
| JP | 2003500675 A | 1/2003 |
| JP | 2009505092 A | 2/2009 |
| JP | 2012211891 A | 11/2012 |
| WO | 0073731 A1 | 12/2000 |
| WO | 2005028996 A1 | 3/2005 |
| WO | 2007020441 A1 | 2/2007 |
| WO | 2011107746 A1 | 9/2011 |

OTHER PUBLICATIONS

"Common" from M-W, 1 pages, printed on Apr. 24, 2019.*
International Search Report issued in PCT/GB2015/051223 dated Jul. 29, 2015 (4 pages).
Written Opinion of the international Searching Authority issued in PCT/GB2015/051223 dated Jul. 29, 2016 (6 pages).
United Kingdom IPO Search Report issued in GB 1407984.2 dated Nov. 5, 2014, 5 pages.
Great Britain Examination Report for Application No. GB1407984.2, dated Feb. 7, 2018, 4 pages.
Notification of Reasons for Refusal for Japanese Application No. 2016-566944, dated Feb. 28, 2019, 6 pages.
Nocedal et al., Numerical Optimization, Chapter 11, Nonlinear Equations, pp. 292-294. Springer 1999, 6 pages.

* cited by examiner

METHOD AND APPARATUS FOR CHARACTERISING INSTRUMENT ERROR

CROSS REFERENCE TO RELATED APPLICATIONS

This application is a National Phase Application of International Application No. PCT/GB2015/051223, filed Apr. 27, 2015 which claims priority to GB Application No. 1407984.2, filed May 6, 2014, the contents of which are incorporated herein by reference.

The present disclosure relates to spatial measurement apparatus and to methods and apparatus for correcting errors in spatial measurements, for example measurements of surfaces, for example surface measurements obtained by following a surface with a measurement probe.

Some surface measurement instruments comprise a measurement probe which is used to follow the surface of a workpiece and a transducer which provides a signal dependent upon the movement of the measurement probe in response to surface characteristics such as texture or form. For example, a measurement probe may traverse a measurement path and follow the form of a surface along that measurement path whilst the position of the measurement probe in the traverse direction is logged and the transducer provides a signal based on deflection of the measurement probe in a measurement direction.

Naturally, the accuracy of such a surface measurement depends on the linearity of the relationship between movements of the measurement probe and the signal provided by the transducer. Non-linearity in this relationship provides a component of the systematic error in any measurement produced by such an instrument. This instrument error may arise from a variety of different sources.

For example, movement of the measurement probe in the measurement direction as it follows the surface from may not be precisely aligned with the measurement direction. For example, the measurement probe may be pivotably mounted and so constrained to follow an arcuate rather than a linear path. Examples of such measurement probes comprise measurement probes mounted on a pivoted arm, for example a stylus mounted on a stylus arm. In such examples so called arcuate error means that movement of the measurement probe is not precisely aligned with the measurement direction and depends upon the amount of deflection of the stylus arm.

Also, the transducer itself may have a non-linear response. For example, where the transducer comprises a Linear Variable Differential Transducer (LVDT), then non-linear changes in the coupling between the core and the coils of the LVDT may occur, particularly at the end of the measurement range. Curved diffraction gratings, or interferometers may also be used to as transducers to provide a signal based on deflection of a measurement probe, and these too may give rise to non-linearity in the characterisation of a surface by a surface measurement instrument.

As another example, the measurement probe itself may be of finite size. In such examples the interaction of the measurement probe with the surface may be a function of the contact angle between the surface and the measurement probe. For example, in a contact stylus having a round tip the surface height measured by the measurement probe depends on the contact angle and the stylus tip radius. These same effects apply to both contact and non-contact measurements. For example, the interaction region of the tip of a scanning tunneling microscope, or the interaction region of a magnetic probe, may both be of finite size, and the so the shape of such an interaction region may also introduce a dependence upon the angle between the surface being measured and the measurement probe.

One way to address these issues is to calibrate the measurement instrument by measuring a path across a known surface form of a standard reference object, such as a sphere or tilted optical flat. These and other reference objects can be manufactured to strict tolerances, and so differences between the known and measured form can be used to characterise the instrument error.

The accuracy of such a calibration depends on knowing not only the shape but also the position of such a reference object. This position is not always known. One way to address this is to make a measurement that includes, and is preferably symmetric about, an axis of symmetry of the reference object. For example if the reference object is a sphere of known radius, a measurement that is symmetric about the crest of the reference sphere may define its position uniquely. However, for some instruments it is not possible to measure both sides of a symmetric reference object. For example, the geometry and size of the measurement probe relative to the reference object may rule this out.

Aspects and embodiments of the disclosure address instrument errors in surface measurement. Some aspects and embodiments of these are set out in the appended claims, and some embodiments will now be described, by way of example only, with reference to the accompanying drawings in which:

In the drawings like reference numerals indicate like elements.

The present disclosure provides methods and apparatus for characterising instrument error in a surface measurement instrument.

As noted above, the present disclosure may find particular application where calibration measurement data does not completely define the object from which it was acquired. For example, where a reference object is a sphere the calibration data may not uniquely define the position of the centre of the sphere, even if the radius is known a priori.

Two sets of calibration measurement data can be obtained each having measurement ranges which at least partially overlap each other, and each representing the known surface form of a different reference object.

A common model can be fitted to both these sets of calibration measurement data in order to characterise the instrument error. This model may comprise the known surface forms of both the reference objects and the expected form of the instrument error. By fitting such a model to both the first calibration measurement data and the second calibration measurement data together it is possible to determine an error function common to both sets of calibration data, for example being independent of the surface from of the object being measured. This common error function may characterise the instrument error.

One example of an expected form of instrument error is a cubic polynomial in Z (the measurement direction) that may be used to characterise arcuate error in a pivotably mounted stylus arm. In this example, the common error function may comprise this expected form modified based on the fit of the model as a whole to both sets of calibration data.

One apparatus in which this disclosure may be useful is described below with reference to FIG. 1 and FIG. 2. Although described with reference to such an apparatus it will be appreciated that methods of the disclosure may be used with other types of apparatus.

Figure 1:
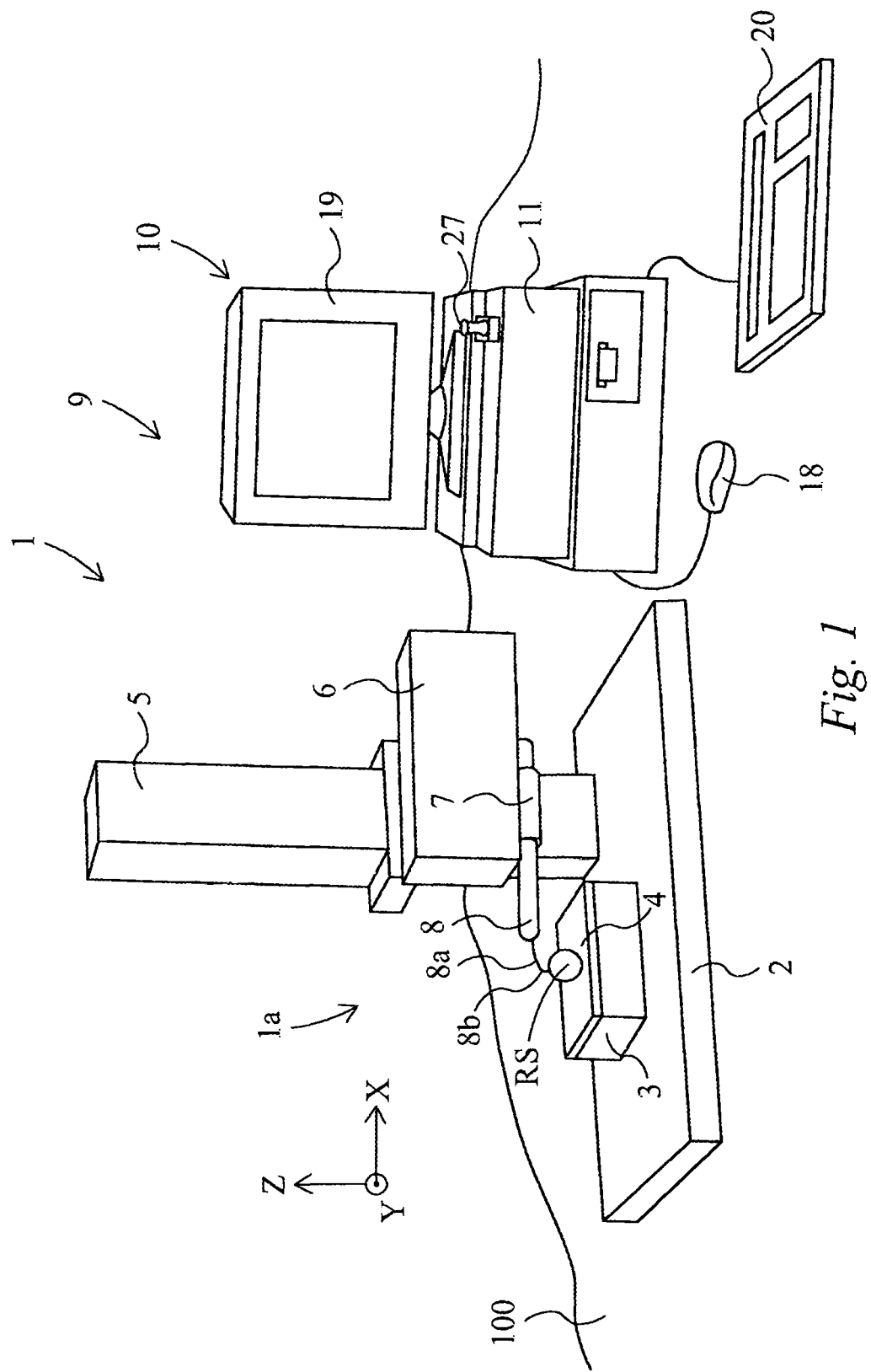
FIG. 1 shows a schematic perspective view of an example of a metrological instrument.

In more detail, FIG. 1 shows a schematic perspective view of a metrological instrument 1 for measuring surface characteristics, in particular at least one of surface form and texture or roughness. The metrological instrument may be based on a Form Talysurf Series of metrological instrument supplied by Taylor Hobson Limited, of Leicester, England, United Kingdom. In this configuration, the metrological instrument 1 has a base 2 designed to be placed on the workbench or desk 100. A workpiece support 3 is mounted to the base 2 and carries a workpiece support platform 4. The workpiece support platform 4 may be fixed or may be movable relative to the support 3 in the Y direction (that is into the plane of the paper in FIG. 1) by means of a motorised ballscrew arrangement (not shown in FIG. 1). The base 2 also carries a column 5 which defines a vertical or Z axis reference datum. A column carriage 6 is mounted to the column 5 so as to be movable in the Z direction (that is up and down the column). In this configuration, movement of the column carriage 6 in the Z direction is effected by a motorised leadscrew drive arrangement (not shown in FIG. 1), although any suitable form of drive mechanism may be used and in an example the column carriage may be manually movable.

The column carriage 6 carries a measurement probe carriage 7 which is movable relative to the column carriage 6 in the X direction in FIG. 1. In this configuration, the measurement probe carriage 7 is mounted so as to be slidable along an X axis datum bar mounted within the column carriage 6 and is pushed or pulled along the X axis datum bar in the X direction by means of a motorised pulley drive arrangement (not visible in FIG. 1) or any other suitable form of drive mechanism.

The measurement probe carriage 7 carries a measurement probe 8 comprising a stylus comprising a stylus arm 8a pivotable about a pivot 8d (not visible in FIG. 1, see FIG. 2) and carrying at its free end a stylus tip 8b which is arranged to come into contact with the surface to be measured so that, as the measurement probe 8 is traversed in the X direction across the surface to be measured, the stylus arm 8a pivots to enable the stylus tip 8b to follow variations of the surface in the Z direction.

The components of the metrological instrument mounted on the base 2 form a measurement system 1a of the metrological instrument 1. The metrological instrument 1 also has a data acquisition, processing and control system (DAPCS) 9 which controls a measurement operation by the measurement system Ia and also processes data received from the measurement system Ia. The DAPCS 9 consists of computing instrument 10 (in the form of a personal computer, workstation or the like) which interfaces with the measurement system.

The measurement probe 8 may comprise a pivotally mounted stylus. This means that the stylus tip 8b moves along an arcuate path and is not precisely perpendicular to the plane of the surface being measured. This arcuate movement is illustrated diagrammatically in FIG. 2 in which the curved line 200 represents the surface of an object over which the stylus tip 8b is being traversed (in this example a surface of a reference sphere).

Figure 2:
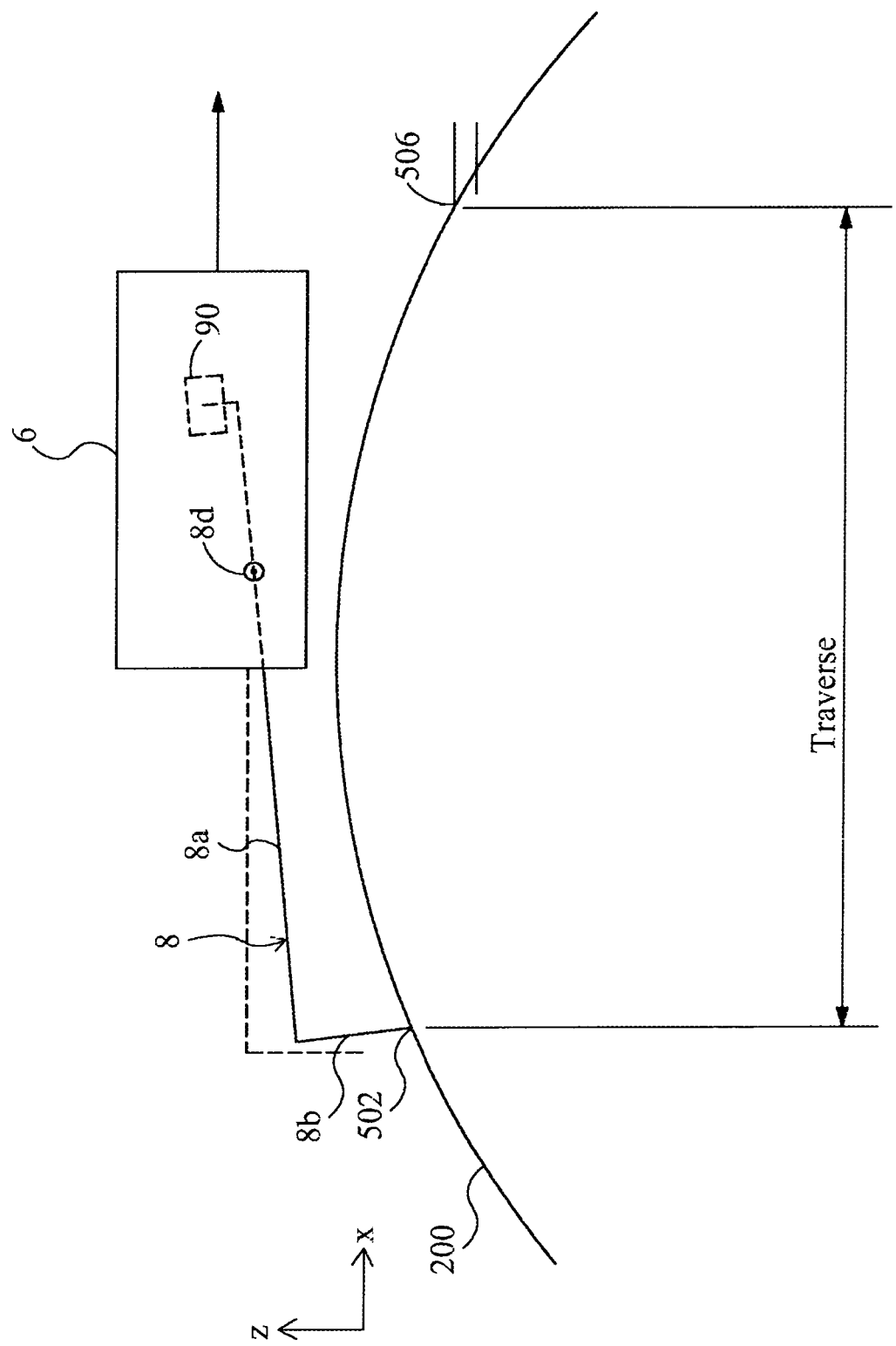
FIG. 2 shows an illustration of part of the metrological instrument shown in FIG. 1 illustrating how the stylus of the metrological instrument moves during a measurement operation.

As illustrated in FIG. 2, a transducer 90 is coupled to the measurement probe 8 and to the DACPS 9.

The transducer is configured to sense movement of the stylus arm 8a about the pivot 8d. The transducer is also configured to provide a signal to the DACPS based on deflection of the measurement probe in a measurement direction, Z.

In operation the DACPS 9 controls the column carriage 6 to move the measurement probe 8 across the surface 200 to be measured so that the measurement probe follows the surface 200 along a measurement path from a starting point 502 to an end point 506. The DACPS logs the position in a traverse direction X of the measurement probe and its deflection in a measurement direction Z as it follows the surface.

FIG. 2 shows two positions of the stylus arm 8a. The position shown in phantom lines is when the stylus arm 8a is effectively horizontal and the position shown in solid lines is the position when the stylus arm 8a has been pivoted so that the stylus tip 8b contacts one end 502 of the measurement range. As can be seen from FIG. 2, the arcuate movement of the stylus tip 8b as the stylus arm 8a pivots causes the X position of the stylus tip 8b to vary in accordance with the angle through which the stylus arm 8a has pivoted so that the X position changes with Z. This effect is known as arcuate error, and contributes to the overall gauge non-linearity of the measurement instrument.

Further inaccuracies may arise from transducer non-linearity and other sources of gauge non-linearity, for example the finite size of the measurement probe, for example the finite size of the stylus tip 8b in a stylus type measurement probe. Such inaccuracies may mean that the X and Z position data obtained during a measurement operation do not accurately reflect the actual X and Z position of the measurement probe.

In order to compensate for these inaccuracies, the metrological instrument 1 is configured to carry out a calibration procedure to determine a common error function that characterises the instrument error, for example at least one component of systematic error, of the metrological instrument 1. This common error function may provide the instrument error as a function of displacement of the measurement probe in the measurement direction and/or the traverse direction. The metrological instrument may also be configured to correct measurements based on the common error function.

Figure 3:
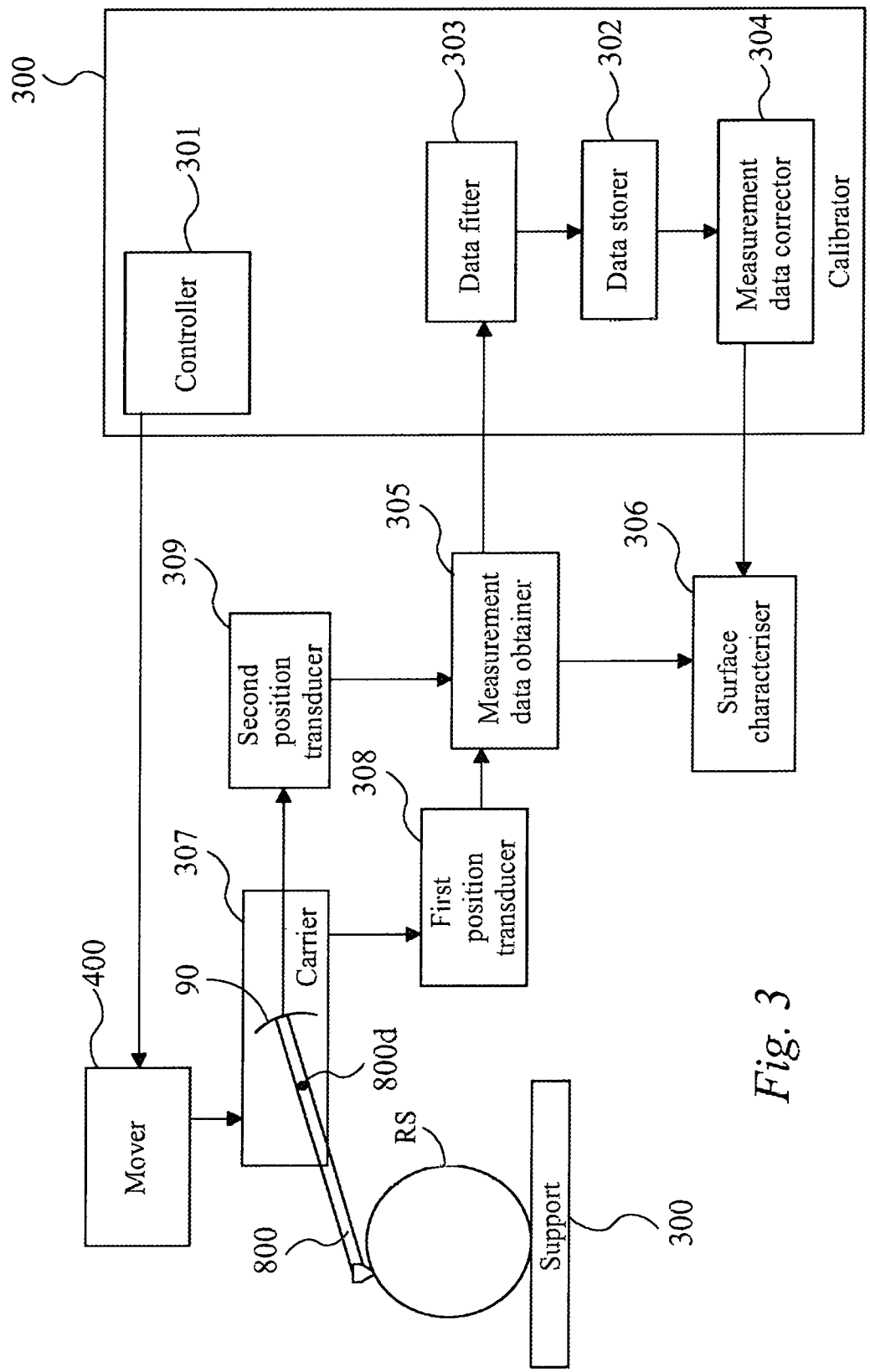
FIG. 3 shows a functional block diagram of a metrological instrument.

FIG. 3 illustrates another example of a metrological instrument. The apparatus illustrated in FIG. 3 comprises a support 300 for receiving objects RS to be measured. A carrier 307 carries a measurement probe 800 so that the measurement probe is movable relative to the carrier 307 and a mover 400 is arranged to effect relative movement between the support 300 and the carrier 307 in a first direction, that is the X direction in the example shown in FIG. 1, to cause the measurement probe 800 carried by the carrier 307 to traverse a measurement path along a surface of an object RS supported by the support 300 so that the measurement probe 800 moves in a second direction, in the example shown in FIG. 1 the Z direction, transverse to the first direction as it follows surface characteristics along the measurement path.

A first position transducer 308 is responsive to relative movement between the support 300 and the carrier 307 to provide first position data representing the position of the measurement probe 800 in the first direction. A second position transducer 309 is responsive to movement of the measurement probe in the second direction determined by detection of movement of the measurement element 90 carried by the measurement probe 800 to provide second position data representing the position of the measurement probe 800 in the second direction.

A measurement data obtainer 305 is arranged to obtain from the first and second position transducers 308 and 309 measurement data comprising X and Z position data for each of a plurality of measurement points along the measurement path.

A calibrator 300 is arranged to carry out the calibration procedure. As shown in FIG. 3, the calibrator 300 comprises a controller 301 arranged to cause the measurement data obtainer 305 to obtain measurement data representing the surface form of a reference object RS by controlling the mover 400 to cause the measurement probe 800 carried by the carrier 307 to traverse a measurement path following the surface of the reference object.

In the apparatus illustrated in FIG. 3, the calibrator 300 comprises a data fitter 303 arranged to store a model for fitting to measurement data obtained by the data obtainer 305, and to fit that model to the data.

The model may comprise a model of at least one known surface form, and a model of the expected form of the instrument error. The model is configured to be fitted to calibration measurement data obtained from at least two measurement paths by selecting:
(a) first parameters describing the known surface form of the first reference object measured by a first one of the measurement paths,
(b) second parameters describing the known surface form of the second reference object measured by a second one of the measurement paths, and
(c) a common error function configured to vary the expected instrument error in the model to fit it to the calibration measurement data.

The data fitter is configured to characterise the actual instrument error by selecting the first and second parameters, and the common error function to fit this model as a whole to calibration measurement data obtained from measurements of at least two reference objects each comprising a different one of the known surface forms described by the model.

The calibrator 300 comprises a data store 302 for storing calibration measurement data, and for storing the common error function.

The calibrator 300 may also have a measurement data corrector 304 operable to correct measurement data obtained during a measurement operation performed after the calibration process. A surface characteriser 306 may be operable to determine at least one surface characteristic of the surface using the measurement data obtained by the measurement data obtainer 305 and/or based on a correction provided by the measurement data corrector 304.

In operation, the calibrator 300 controls the measurement probe 800 to traverse a measurement path across the surface of a first reference object, and the measurement data obtainer 305 obtains first calibration measurement data in the traverse direction, X, and the measurement direction Z, defining a measurement of the known surface form of the first reference object (e.g. $Xm_{1i}$, $Zm_{1i}$, where i=1 ... N, and N is the total number of measurements). The first calibration measurement data may be stored in the data storer 302.

The reference object may then be replaced by a second reference object and second calibration measurement data $Xm_{2i}$, $Zm_{2i}$ can be obtained by following the surface of the second reference object along a second measurement path. The first and second measurement paths are selected so that they overlap with each other in the measurement direction (Z), and they may also overlap in the traverse direction (X).

The data fitter 303 then fits the model described above to both the first calibration measurement data and the second calibration measurement data by selecting first parameters describing the first known surface form, second parameters describing the second known surface form and the common error function so as to reduce the differences between the fitted model and both the first and second calibration measurement data. The data fitter 303 may select these parameters and the common error function using a merit function configured to provide a metric of the fit between the model and both the first calibration measurement data and the second calibration measurement data. Such metrics include least squares, maximum likelihood, and other measures of the closeness of a fit of model to data.

Having fitted the model, the data fitter 303 provides the parameters which define that fit to the data storer 302.

It will be appreciated that the parameters which define the fit comprise (a) the parameters of the known surface forms and (b) the common error function describing the effect of the expected form of instrument error in both sets of calibration measurement data (e.g. that error which may be independent of the object being measured and so characteristic of the instrument itself). This common error function may be used by the measurement data corrector 304 to correct other measurements performed by the measurement instrument.

Figure 4:
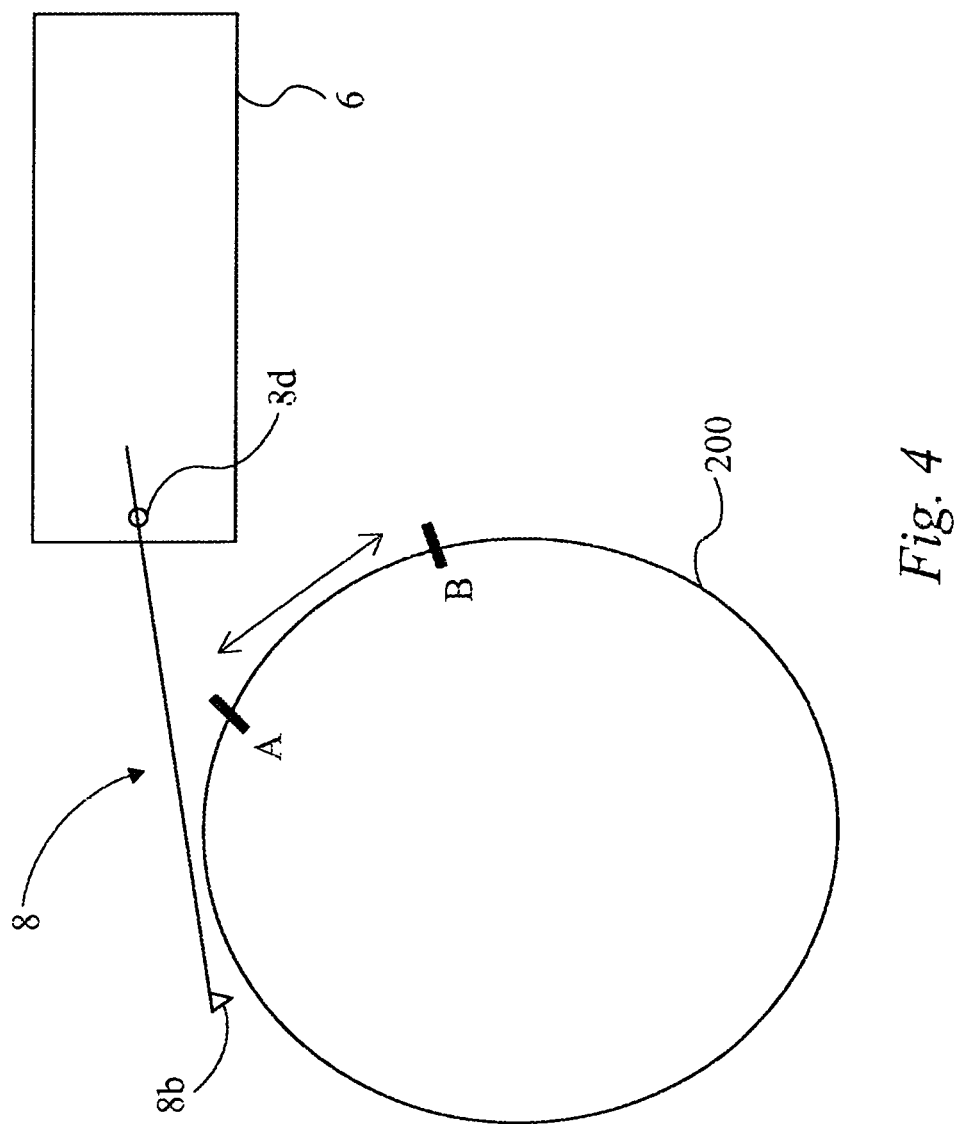
FIG. 4 shows an illustration of a measurement probe performing a measurement.
Figure 5:
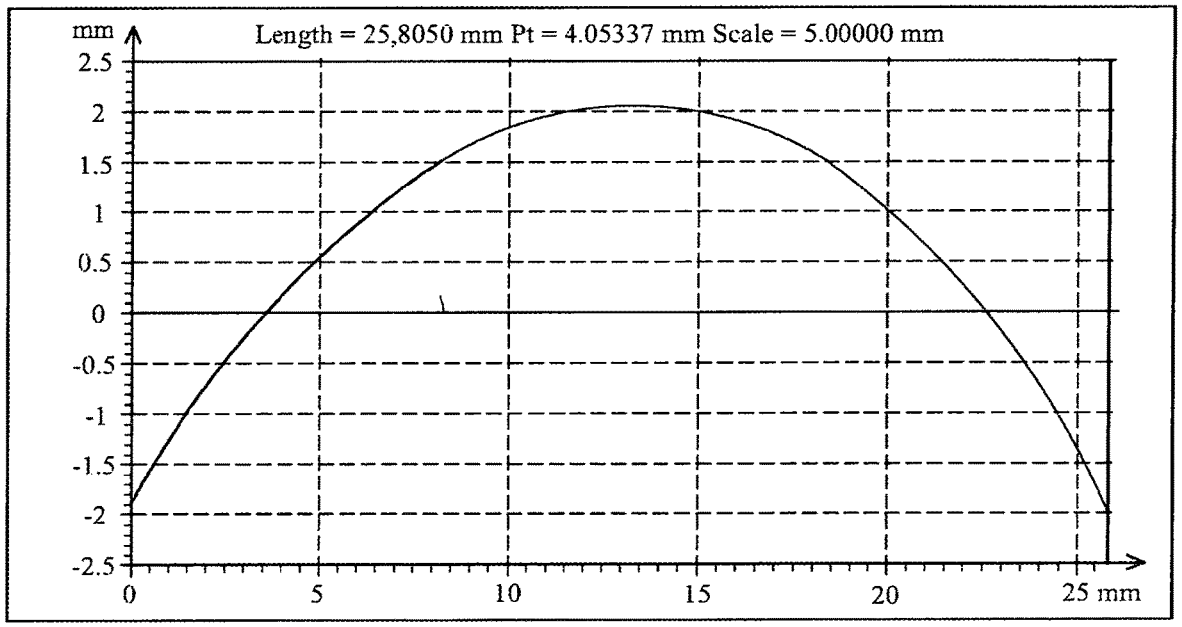
FIG. 5 shows examples of measurement data and a characterisation of instrument error.
Figure 5:
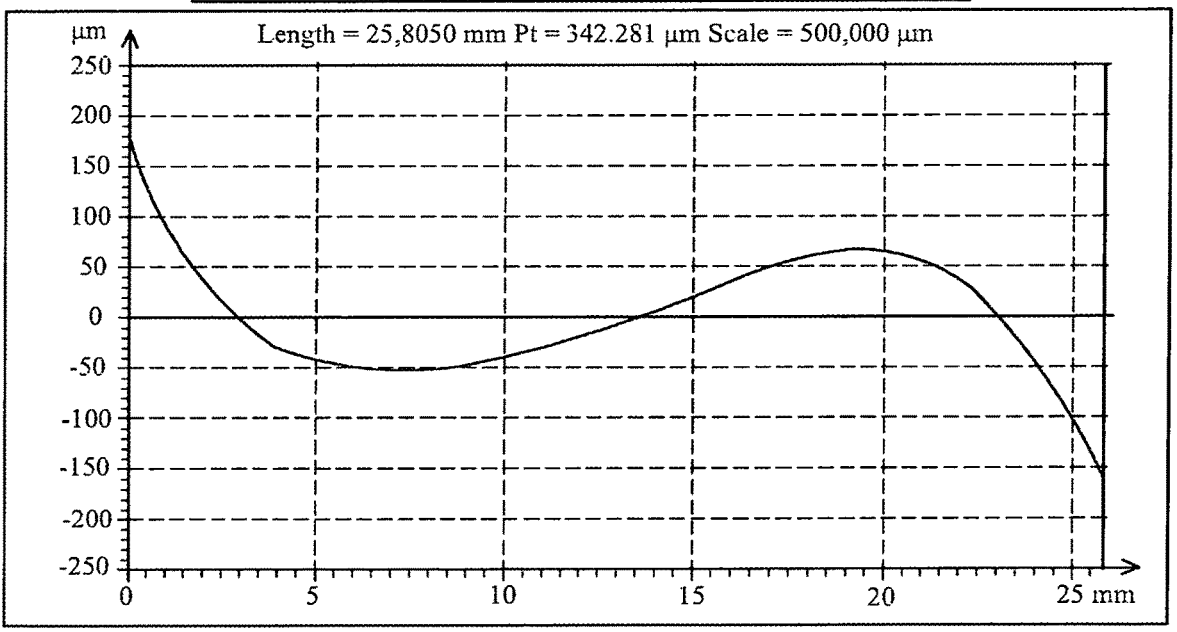

To assist in understanding the disclosure, as another example, application of this method of operation of the apparatus of FIG. 3 to characterise arcuate error based on measurement of reference spheres will now be described. This method of operation will be described with reference to FIG. 4. FIG. 4 is similar to FIG. 2, but in the example illustrated in FIG. 2 due to the relative size of the measurement probe 8b and at least one of the reference spheres 200, the measurement probe is unable to follow the surface of the reference object 200 over its crest.

In this method of operation the reference objects comprise reference spheres of known radius. The "true" data points of a measurement path following the surface of such a reference sphere $(X_i, Z_i)$ i=1, ..., N lie on a circle with known radius R and unknown centre (a,b). That is $$(X_i-a)^2+(Z_i-b)^2=R^2 \qquad \text{Equation 1}$$

where i=1 ... N, and N is the total number of data points in the measurement path.

In this example, the expected form of the instrument error comprises arcuate error and perhaps some gauge nonlinearity. The data fitter 303 describes this expected form of instrument error using two cubic polynomials $$Z_i=A*Zm_i+B*Zm_i^2+C*Zm_i^3 \qquad \text{Equation 2}$$

$$X_i=Xm_i+D*Z_i+E*Z_i^2+F*Z_i^3 \qquad \text{Equation 3}$$

Where A, B, C, D, E and F are coefficients representing which fit the expected, cubic, form of the instrument error to the measured data. Equation 2 and Equation 3 therefore provide one example of a common error function which in this example is defined by the coefficients, A to F, and the expected, cubic, form of the instrument error.

The data fitter 303 obtains a model comprising the known surface forms (based on Equation 1) and this expected form of error (Equation 2 and Equation 3).

In this example, the model as a whole therefore may be expressed as follows:

$$(X_{ji}-a_j)^2+(Z_{ji}-b_j)^2=R_j^2 \qquad \text{Equation 4}$$

where, $$Z_{ji}=A*Zm_{ji}+B*Zm_{ji}^2+C*Zm_{ji}^3 \qquad \text{Equation 5}$$

$$X_{ji}=Xm_{ji}+D*Z_{ji}+E*Z_{ji}^2+F*Z_{ji}^3 \qquad \text{Equation 6}$$

Note that the coefficients A to F are the same for both reference objects, j=1, 2. The location of the first reference object $a_1$, $b_1$ is an example of first parameters, describing the known surface form of the first reference object. Likewise, the location of the second reference object $a_2$, $b_2$, is an example of second parameters describing the known surface form of the second reference object.

To fit this model to the measured data the data fitter 303 determines the differences between the measured data and the model:

$$\text{diff}_{ji}(A,B,C,D,E,F,a_j,b_j)=R_j^2-(X_{ji}-a_j)^2-(Z_{ji}-b_j)^2 \qquad \text{Equation 7}$$

where $X_{ji}$ and $Z_{ji}$ are defined by Equation 5 and Equation 6, above.

In this example, the data fitter 303 selects the locations of the first and second reference objects $(a_j,b_j)$, j=1,2 and the values of the coefficients A to F to reduce the sum of squares of the differences defined by Equation 7. The data fitter 303 may do this using a merit function, e.g.

$$\sum_{j=1}^{2}\sum_{i=1}^{N}\text{diff}_{ji}(A, B, C, D, E, F, a_j, b_j)^2.$$

The coefficients A to F obtained from this fit combine with the expected form of the instrument error to provide a common error function which characterises the instrument error common to both the first calibration measurement data and the second calibration measurement data. The data fitter 303 can then provide the common error function to the data storer 302 to be used in correcting measurements of the metrological instrument.

The example above has used arcuate error as an example of a common error function, but other sources of error may also be characterised by methods of the disclosure, either in isolation, or together with arcuate error depending on the system concerned.

As another example, the common error function used by the data may comprise the expected form of the effect of a finite size measurement probe, for example stylus tip radius. In these examples, Equations 5 to 7, above may be modified to take account of the finite size of the measurement probe, for example based on the radius of a stylus tip.

In these examples the data fitter can determine the size of the measurement probe, for example the measurement probe tip size, for example its radius, for example a stylus tip radius. In these examples the common error function is a function of a size of the measurement probe. The data fitter can then determine the size of the measurement probe based on fitting the model to both the first calibration measurement data and the second calibration measurement data following the approach outlined above.

It will be appreciated in the context of the present disclosure that this is a Nonlinear Least Squares problem and can be solved using any standard nonlinear least squares problem solving technique. One example is the Gauss-Newton Algorithm, but other techniques such as stochastic methods, e.g. simulated annealing may also be used. It will be appreciated in the context of the present disclosure that the model of the calibration measurement data depends on the geometry of the reference objects. It also depends upon the expected form of the instrument error and any "cross-terms" or interaction that may arise between the geometry of the reference objects and the expected form of the instrument error. For example, the reference objects may comprise spheres of known radius and known position (e.g. perfectly centred in a coordinate system of the measurement instrument). The reference objects may also comprise sloping flats, the slope of such a flat may be known a priori or it may be obtained by fitting a model to measured calibration data. In these and other examples, the model of a measurement of the reference surface may comprise a straight line. In these and other examples, the model of a measurement of the reference surface and the interaction of these reference surfaces with the expected form of the instrument error may be linear, or at least linearisable. Accordingly, measurement may be modelled using a general linear model, for example:

$$Y=XB+U$$

where Y is a vector of the calibration measurement data, X is a matrix comprising the model, B is a vector containing coefficients of the model and U represents random error. It will be appreciated therefore that in these examples analytic solutions may be available and the data fitter 303 need not perform a numerical search algorithm to fit the model to the data.

Other examples, variations, and further refinements of the present disclosure will be apparent in the context of the present disclosure.

With reference to the drawings and description in general, it will be appreciated that schematic functional block diagrams are used to indicate functionality of systems and apparatus described herein. It will be appreciated however that the functionality need not be divided in this way, and should not be taken necessarily to imply any particular structure of hardware. The function of one or more of the elements shown in the drawings may be further subdivided, and/or distributed throughout apparatus of the disclosure. In some embodiments the function of one or more elements shown in the drawings may be integrated into a single functional unit.

The above embodiments are to be understood as Illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The activities and apparatus outlined herein may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

The method described below may be achieved using the calibrator 300 functionality provided by programming of the processor 13, and specifically the data fitter 303.

If the method employs obtaining calibration measurement data in an uphill and a downhill direction (i.e. ascending in Z and descending in Z, for example over the crest of a reference object such as a sphere), the method may provide an estimate or average of the radius Rt for both sides of the stylus tip geometry.

In the above described examples, the calibration procedure could be repeated one or more times for an increased calibration range, for example with the aim of calibrating as close as possible to the entire measurement range ZT of the Z position transducer.

In the above described examples, the calibration procedure is effected for first and second directions which may, as described above, be Z and X but could be X and Y or Z and Y. There may however be metrological instruments for which calibration in only one of the two directions is necessary. It may also be possible to apply the present invention where the calibration procedure is to be effected for three orthogonal axes X, Y and Z, or for non-orthogonal or for non-Cartesian axes.

The reference objects may comprise reference spherical surfaces. The surfaces of these objects may each have a different radius of curvature. For example, the known surface form of the first reference object may have a different radius of curvature from the known surface form of the second reference object. Where a third reference object is used, this too may have a third, different, radius of curvature.

The above described method may be carried out using reference objects of other shapes. For example, a reference cylinder may be used. It may also be possible to use reference objects having other known forms such as aspheric reference objects, or trapezoidal or prismatic forms having up and down inclined surfaces or curved surfaces that provide non-circular calibration measurement paths.

Calibration measurement data could be obtained from additional reference objects, and the model may comprise the known surface form of at least a third reference object. In these and other examples fitting the model to the data may comprise selecting third parameters describing the known surface form of the at least a third reference object.

In the above described configurations, the measurement probe uses a pivotable stylus arm. The present invention may, however, be applied to a metrological instrument having an axially movable rather than a pivotable measurement probe so that, as the measurement probe is moved along the continuous measurement path, instead of the measurement probe pivoting as it follows surface variations along the continuous measurement path, the measurement probe as a whole moves in the Z direction. The measurement probe may, for example, consist of an elongate stylus arm arranged with its longitudinal axis parallel to the said axis so that when relative movement is effected between the workpiece and the measurement probe, a stylus tip at the end of the elongate stylus arm follows variations in the surface along the continuous measurement path so that the stylus arm as a whole moves in the Z direction, that is parallel to its longitudinal axis. Where the present invention is applied to metrology metrological instrument using axially movable measurement probes, then the arcuate error discussed above will not arise. There may however still be some error in X with Z, for example due to transducer non-linearities. Also, in the above described configurations, the measurement probe contacts the surface and has a stylus tip 8b with a radius Rt. However non-contact measurement probes such as atomic force measurement probes could also be used. The above described examples for calculating the stylus tip radius Rt may also be applied to obtain a radius for a measurement probe having a similar or different geometry to that described above.

The present invention may also be applicable to instruments such as Coordinate Measurement Machines (CMM) in which a measurement probe is mounted on a first carriage so as to be movable in the Z direction, the first carriage is mounted on a second carriage movable in the Y direction and the second carriage is mounted on a third carriage movable in the X direction so that the measurement probe is movable in three directions and in which each carriage is associated with a respective transducer and the measurement probe is moved between different X, Y, Z measurement locations along a measurement path so that, for every X, Y, Z position of the probe, respective X, Y and Z position data are provided by the transducers.

In some configurations, a metrological instrument has a driver 33 that effects relative movement between a support 11 and a measurement probe 8 carriage 7 in a first direction X to cause the measurement probe 8 to traverse a measurement path along a surface of an object supported by the support. The measurement probe 8 moves in a second direction Z transverse to the first direction as it follows surface characteristics. Respective first and second position transducers 35, 32 provide first and second position data representing the position of the measurement probe in the first and second direction. A calibrator 300 carries out a calibration procedure using measurement data obtained on a surface of known form.

In an embodiment an apparatus of the disclosure is configured to perform a method comprising:
  obtaining first calibration measurement data for a symmetrical (for example, semi-circular) measurement path along a first reference sphere;
  obtaining second calibration measurement data for a symmetrical (for example, semi-circular) measurement path along a second reference sphere;
  fitting a model to the first calibration measurement data, wherein the model comprises:
    (1) a known surface form of the first calibration measurement data, and
    (2) an expected form of the instrument error based on a nominal stylus tip radius Rt;
  calculating the radius of the second reference sphere based on the fit of the model to the first calibration data and the nominal stylus tip radius, Rt;

and in the event that the calculated radius of the second reference sphere does not match its known radius to within a selected tolerance:
adjusting the nominal stylus tip radius, Rt, based on a known radius of the second reference sphere and the calculated radius of the second reference sphere;
recalculating the radius of the second reference sphere based on the fit of the model to the first calibration data and the adjusted nominal stylus tip radius, Rt
and repeating the adjusting and recalculating steps until the calculated radius of the second reference sphere does match its known radius to within the selected tolerance.

The value of Rt obtained at convergence of this procedure can then be used to process data obtained from measurements using that stylus. It will be appreciated that this method may be used to determine the size of other measurement probes. In this and other embodiments, fitting the model may comprise determining calibration coefficients, for example the coefficients of a polynomial describing the expected form of the instrument error.

In some embodiments of the disclosure the first calibration measurement data and the second calibration measurement data are obtained from measurement paths which may be symmetric about a line of symmetry of at least one of the corresponding reference objects. Where the expected form of the instrument error includes the effect of the size and/or shape of the measurement probe this may provide an estimate/average of radius for both sides of measurement probe geometry. The measurement probe may comprise a stylus tip.

In some configurations the common error function comprises basis functions such as splines, exponential functions and sinusoids may be used. In some configurations the common error function comprises a series, for example a Taylor series or a Fourier series.

The invention claimed is:

1. A method for characterising instrument error in a surface measurement instrument, the method comprising:
obtaining first calibration measurement data representing a known surface form of a first reference object;
obtaining second calibration measurement data representing a known surface form of a second reference object, wherein at least a portion of the second calibration measurement data represents a measurement range that overlaps with at least a portion of a measurement range of the first calibration measurement data, wherein the known surface form of the second reference object is different from the known surface form of the first reference object;
fitting a model of the known surface forms and of the expected form of the instrument error to both the first calibration measurement data and the second calibration measurement data together to determine:
first parameters describing the known surface form of the first reference object;
second parameters describing the known surface form of the second reference object; and
an error function representing the instrument error common to both the first calibration measurement data and the second calibration measurement data;
wherein the error function determined by said fitting characterises the instrument error, wherein the instrument error comprises at least one of error due to gauge non-linearity and error due to stylus tip geometry.

2. The method of claim 1 wherein fitting comprises selecting the first parameters, the second parameters, and the error function to reduce the differences between the model and both the first and second calibration measurement data.

3. The method of claim 1 wherein the error function comprises a function of position of a measurement probe of the measurement instrument.

4. The method of claim 1 wherein:
the first parameters comprise at least one of a location of the first reference object and a radius of curvature of the first reference object,
and the second parameters comprise at least one of a location of the second reference object and a radius of curvature of the second reference object.

5. The method of claim 1 wherein at least one of the first and second calibration measurement data represents a measurement path which is asymmetric with respect to the reference surface from which that measurement data was obtained.

6. The method of claim 1 wherein the error function comprises a linear sum of basis functions.

7. The method of claim 1 wherein the reference objects each comprise a curved surface, wherein the curved surface is at least part spherical.

8. The method of claim 1 wherein the model is based on $$(X_{ji}-a_j)^2+(Z_{ji}-b_j)^2=R_j^2$$

where, $$Z_{ji}=A*Zm_{ji}+B*Zm_{ji}^2+C*Zm_{ji}^3,$$

$$X_{ji}=Xm_{ji}+D*Z_{ji}+E*Z_{ji}^2+F*Z_{ji}^3$$

X indicates the true position in a traverse direction of a measurement probe of the Measurement instrument,
Xm indicates the measured position in a traverse direction of a measurement probe of the measurement instrument,
Z indicates the position in a measurement direction of a measurement probe of the measurement instrument,
Zm indicates the measured position in a measurement direction of a measurement probe of the measurement instrument,
i=1, . . . , N, indicating N measurements along a measurement path,
j=1,2 indicating the reference object from which the measurement data was obtained,
A, B, C, D, E and F are calibration coefficients defining the error function, and
a, b, and R are the first (j=1) and second (j=2) parameters respectively.

9. The method of claim 1 wherein the error function is selected to model gauge non-linearity of the measurement instrument, wherein gauge non linearity comprises arcuate error.

10. A non-transitory computer readable medium comprising program instructions operable to program a processor to perform the method of claim 1.

11. A method of configuring a metrological apparatus comprising sending a signal to the metrological apparatus over a network, wherein the signal comprises machine readable instructions operable to program the apparatus to the method of claim 1.

12. A metrological apparatus calibrated according to the method of claim 1.

13. The method of claim 2 wherein reducing the differences comprises reducing a merit function,
wherein the merit function comprises a metric of the closeness of fit of the model to a data set comprising the first calibration measurement data and the second calibration measurement data, thereby to provide a metric of said closeness of fit which is common to both the first calibration measurement data and the second calibration measurement data.

14. The method of claim 3 wherein the instrument is configured to obtain measurement data indicating the position in a measurement direction of a surface by following a measurement path in a traverse direction, wherein the position of the measurement probe comprises position in at least one of the measurement direction and the traverse direction.

15. The method of claim 3 wherein the error function is also a function of a size of the measurement probe, and the method comprises determining the size based on fitting the model to both the first calibration measurement data and the second calibration measurement data, wherein the measurement probe comprises a tip and the size comprises the radius of the tip and wherein the known surface forms comprise curved surfaces and the radius of curvature of the known surface forms are known a priori.

16. The method of claim 4 wherein at least one of: the location of the first reference object, the radius of curvature of the first reference object, the second reference object, and the radius of curvature of the second reference object are known a priori.

17. The method of claim 14 wherein the error function comprises a model of the error in the measurement direction as a function of measured position in the measurement direction.

18. The method of claim 14 wherein the error function comprises a model of the error in the traverse direction as a function of position in the measurement direction.

19. The method of claim 15 further comprising:
obtaining third calibration measurement data representing the known surface form of a third reference object;
determining measured surface data based on the third calibration measurement data and the error function;
determining a new size of the measurement probe based on differences between the measured surface data and the known surface form, and in the event that the differences exceed a selected threshold, repeating the determination of measured surface data based on the new size.

20. A surface measurement instrument comprising:
a measurement probe configured to follow a surface to be measured;
a measurement data obtainer configured to:
obtain first calibration measurement data representing the known surface form of a first reference object in a first measurement range to be calibrated;
obtain second calibration measurement data representing the known surface form of a second reference object in a second measurement range to be calibrated, wherein at least a portion of the second measurement range overlaps with at least a portion of the first measurement range, wherein the known surface form of the first reference object is different from the known surface form of the second reference object;
a data fitter configured to fit a model of the known surface forms and of the expected form of the instrument error to both the first calibration measurement data and the second calibration measurement data to determine:
first parameters describing the known surface form of the first reference object;
second parameters describing the known surface form of the second reference object; and
an error function representing the instrument error common to both the first calibration measurement data and the second calibration measurement data;
wherein the error function obtained by fitting the model to both the first calibration measurement data and the second calibration measurement data characterises the instrument error, wherein the instrument error comprises at least one of error due to gauge non-linearity and error due to stylus tip geometry.

* * * * *